(12) United States Patent
Lee et al.

(10) Patent No.: US 11,687,731 B2
(45) Date of Patent: Jun. 27, 2023

(54) METHOD AND DEVICE FOR TRACKING DIALOGUE STATE IN GOAL-ORIENTED DIALOGUE SYSTEM

(71) Applicant: SK TELECOM CO., LTD., Seoul (KR)

(72) Inventors: Hwa Ran Lee, Seoul (KR); Tae Yoon Kim, Seoul (KR); Jin Sik Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 29 days.

(21) Appl. No.: 17/619,568

(22) PCT Filed: Jul. 7, 2020

(86) PCT No.: PCT/KR2020/008832
§ 371 (c)(1),
(2) Date: Dec. 15, 2021

(87) PCT Pub. No.: WO2021/010636
PCT Pub. Date: Jan. 21, 2021

(65) Prior Publication Data
US 2022/0382995 A1 Dec. 1, 2022

(30) Foreign Application Priority Data
Jul. 17, 2019 (KR) .................. 10-2019-0086380

(51) Int. Cl.
*G06F 40/35* (2020.01)
*G06F 16/332* (2019.01)
*G06N 3/045* (2023.01)

(52) U.S. Cl.
CPC .......... *G06F 40/35* (2020.01); *G06F 16/3329* (2019.01); *G06N 3/045* (2023.01)

(58) Field of Classification Search
CPC ...... G06F 40/284; G06F 40/289; G06F 40/30; G06N 3/08; G06N 3/049; G10L 15/04;
(Continued)

(56) References Cited

U.S. PATENT DOCUMENTS 11,068,474 B2 * 7/2021 Ni ............................ G06N 3/08
11,580,968 B1 * 2/2023 Gupta .................... G10L 15/18
(Continued)

FOREIGN PATENT DOCUMENTS

KR 10-2012-0075585 A 7/2012
KR 10-2018-0090869 A 8/2018

OTHER PUBLICATIONS

PCT International Search Report and Written Opinion, PCT/KR2020/008832, dated Dec. 1, 2020, 12 pages.
(Continued)

*Primary Examiner* — Akwasi M Sarpong
(74) *Attorney, Agent, or Firm* — WTA Patents (57) ABSTRACT

The present disclosure in some embodiments provides a dialogue state tracking method and a dialogue state tracking apparatus in a goal-oriented dialogue system, which track a dialogue state through training based on an attention mechanism between utterances and contextual semantic vectors corresponding respectively to domain-slot types and based on a distance metric-based non-parametric method and thereby facilitate service extension to a multi-domain scenario in the dialogue system.

11 Claims, 6 Drawing Sheets

Dialog Example

Turn 1, U : Hello, I'm looking for a restaurant, either Mediterranean or Indian, it must be reasonably priced though.

Turn 2, S : Sorry, we don't have any matching restaurants.

U : How about Indian?

Turn 3, S : We have plenty of Indian restaurants. Is there a particular place you'd like to stay in?

U : I have no preference for the location
I just need an address and phone number (58) Field of Classification Search
CPC ......... G10L 15/06; G10L 15/16; G10L 15/18; G10L 15/22; G10L 15/063; G10L 15/1815
USPC .......................................................... 704/9
See application file for complete search history.

(56) References Cited

U.S. PATENT DOCUMENTS

| | | |
|---|---|---|
| 2012/0053945 A1 | 3/2012 | Gupta et al. |
| 2012/0156660 A1 | 6/2012 | Kwon et al. |
| 2017/0069310 A1* | 3/2017 | Hakkani-Tur ...... G10L 15/1815 |
| 2017/0270929 A1 | 9/2017 | Aleksic et al. |
| 2018/0060301 A1* | 3/2018 | Li .......................... G06N 3/08 |
| 2018/0137854 A1* | 5/2018 | Perez ...................... G06F 40/35 |
| 2018/0336895 A1 | 11/2018 | Aleksic et al. |
| 2019/0180743 A1* | 6/2019 | Yoshida ................. G10L 15/02 |
| 2020/0090641 A1* | 3/2020 | Kim ....................... G06N 3/045 |
| 2020/0105272 A1* | 4/2020 | Wu ......................... G06N 5/00 |
| 2020/0135203 A1 | 4/2020 | Aleksic |

OTHER PUBLICATIONS

Mrksic, Nikola et al., Multi-domain Dialog State Tracking Using Recurrent Neural Networks. arXiv:1506.07190v1. Jun. 23, 2015 [Retrieved on Nov. 24, 2020] Retrieved from <URL:https://arxiv.org/pdf/1506.07190v1.pdf.

* cited by examiner

Dialog Example

Turn 1,  U : Hello, I'm looking for a restaurant, either Mediterranean or Indian, it must be reasonably priced though.

Turn 2,  S : Sorry, we don't have any matching restaurants.

U : How about Indian?

Turn 3,  S : We have plenty of Indian restaurants. Is there a particular place you'd like to stay in?

U : I have no preference for the location
I just need an address and phone number

METHOD AND DEVICE FOR TRACKING DIALOGUE STATE IN GOAL-ORIENTED DIALOGUE SYSTEM

TECHNICAL FIELD

The present disclosure in some embodiments relates to a method and apparatus for dialogue state tracking for use in a goal-oriented dialogue system between a user and the system.

BACKGROUND

The statements in this section merely provide background information related to the present disclosure and do not necessarily constitute prior art.

A dialogue system supports a user so that the user can interact with a computer application program through a dialog. Task-based or goal-oriented dialogue systems help users achieve goals, such as finding a restaurant or booking a flight. A dialogue state tracker also called a belief tracker, is a component of a dialogue system that interprets user utterances and updates a belief state which is the system's internal representation of the state of the dialogue. A belief state is a probability distribution over a dialogue state to determine the action the system needs to take next. The responses that the system performs are expressed as utterances by the natural language generator.

Utterances exchanged in the dialogue system include given domains, slot types (slot-type), and slot values (slot-value) which are preset in a domain ontology. For example, the domains define the range of slot values as restaurants, hotels, attractions, and the like. The slot types may include, e.g., food, time, and address, and specific examples of slot value may be steak, 7 p.m., a precise address, and the like. As a dialogue progresses in the dialogue system, the belief tracker performs dialogue state tracking by predicting, from pre-selected candidate slot values, a probability distribution of a slot value related to the content of the utterance. To determine the next responsive action following the dialogue policy, the dialogue system uses the prediction result by the belief tracking, so the accuracy of the belief tracking is very important in terms of system performance improvement.

As a conventional method for performing belief tracking, for example, Non-Patent Document 3 devised a belief tracking model specialized for a specific domain and slot based on the characteristics of a domain and a slot used in a dialogue system. Due to these characteristics, the conventional method has shown limitations in expanding the service scenario supported by the dialogue system. Accordingly, there is a need for a belief tracking method, that is, a dialogue state tracking method that is domain- and slot-independent to take minimized effort to design a belief tracking model as the service scenario extends including a multi-domain scenario expansion.

PRIOR ART LITERATURE

Non-Patent Documents

Non-patent document 1: Nikola Mrksic and Ivan Vulie. 2018. Fully statistical neural belief tracking. In *Proceedings of the 56th Annual Meeting of the Association for Computational Linguistics*, pages 108-113.

Non-patent document 2: Osman Ramadan, Pawel Budzianowski, and Milica Gasic. 2018. Large-scale multi-domain belief tracking with knowledge sharing. In *Proceedings of the 56th Annual Meeting of the Association for Computational Linguistics*, pages 432-437.

Non-patent document 3: Victor Zhong, Caiming Xiong, and Richard Socher. 2018. Global-locally self-attentive dialogue state tracker. In *Proceedings of the 56th Annual Meeting of the Association for Computational Linguistics*, pages 1458-1467.

Non-patent document 4: Elnaz Nouri and Ehsan Hosseini-Asl. 2018. Toward scalable neural dialogue state tracking model. *arXiv preprint*, arXiv:1812.00899.

Non-patent document 5: Liliang Ren, Kaige Xie, Lu Chen, and Kai Yu. 2018. Towards universal dialogue state tracking. In *Proceedings of the 2018 Conference on Empirical Methods in Natural Language Processing*, pages 2780-2786.

Non-patent document 6: Jacob Devlin, Ming-Wei Chang, Kenton Lee, and Kristina Toutanova. 2018. BERT: Pre-training of deep bidirectional transformers for language understanding. *arXiv preprint*, arXiv:1810.04805.

DISCLOSURE

Technical Problem

The present disclosure in some embodiments seeks to provide a dialogue state tracking method and a dialogue state tracking apparatus for tracking a dialogue state between a user and the system in a goal-oriented dialogue system through training based on an attention mechanism between utterances and contextual semantic vectors corresponding respectively to domain-slot types and based on a distance metric-based non-parametric method and thereby facilitate service extension to a multi-domain scenario in the dialogue system.

SUMMARY

At least one embodiment of the present disclosure provides a method of training a dialogue system, including a step of obtaining utterances for learning, a domain-slot type, and a target slot value related to the utterances, a step of performing semantic generation through generating a first contextual semantic matrix by encoding the utterances for learning, generating a second contextual semantic vector by encoding the domain-slot type, and generating a third contextual semantic vector by encoding the target slot value, a step of calculating a context vector by processing vectors constituting the first contextual semantic matrix based on a relevance of the vectors to the second contextual semantic vector, a step of inputting the context vector into a learning model, and a step of providing the learning model with an update directed toward reducing a distance between an output of the learning model and the third contextual semantic vector.

Another embodiment of the present disclosure provides a method of tracking a dialogue state in a dialogue system, including a step of obtaining target utterances between the dialogue system and a user, a step of generating a first contextual semantic matrix by encoding respective words included in the target utterances, a step of calculating, by processing vectors constituting the first contextual semantic matrix based on a relevance of the vectors to a plurality of second contextual semantic vectors pre-stored and corresponding respectively to a plurality of domain-slot types, a context vector for each second contextual semantic vector, a step of inputting each context vector into a learning model that is pre-trained, and a step of deriving, from a plurality of third contextual semantic vectors pre-stored and corresponding respectively to a plurality of candidate slot values, a slot value corresponding to a third contextual semantic vector alone having a minimum distance from an output of the learning model for each context vector.

Yet another embodiment of the present disclosure provides an apparatus for tracking a dialogue state, including an input unit, a data generating unit, and a classification unit. The input unit is configured to obtain target utterances between a dialogue system and a user. The data generating unit is configured to generate a first contextual semantic matrix by encoding respective words included in the target utterances and to calculate, by processing vectors constituting the first contextual semantic matrix based on a relevance of the vectors to a plurality of second contextual semantic vectors pre-stored and corresponding respectively to a plurality of domain-slot types, a context vector for each second contextual semantic vector. The classification unit is configured to input each context vector into a pre-trained learning model and to derive, from a plurality of third contextual semantic vectors pre-stored and corresponding respectively to a plurality of candidate slot values a slot value corresponding to a third contextual semantic vector alone having a minimum distance from an output of the learning model for each context vector.

Yet another embodiment of the present disclosure provides a computer-readable medium storing computer-executable instructions for causing, when executed by the computer, the computer to perform a method including a step of obtaining target utterances between the dialogue system and a user, a step of generating a first contextual semantic matrix by encoding respective words included in the target utterances, a step of calculating, by processing vectors constituting the first contextual semantic matrix based on a relevance of the vectors to a plurality of second contextual semantic vectors pre-stored and corresponding respectively to a plurality of domain-slot types, a context vector for each second contextual semantic vector, a step of inputting each context vector into a learning model that is pre-trained, and a step of deriving, from a plurality of third contextual semantic vectors pre-stored and corresponding respectively to a plurality of candidate slot, a slot value corresponding to a third contextual semantic vector alone having a minimum distance from an output of the learning model for each context vector.

Advantageous Effects

As described above, the present disclosure in some embodiments provides a dialogue state tracking method and a dialogue state tracking apparatus for tracking a dialogue state between a user and the system in a goal-oriented dialogue system through training based on an attention mechanism between utterances and contextual semantic vectors corresponding respectively to domain-slot types and based on a distance metric-based non-parametric method, which can facilitate service extension to a multi-domain scenario in the dialogue system.

REFERENCE NUMERALS

| | |
|---|---|
| 100: dialogue state tracker | 110: input unit |
| 120: learning unit | 121: data generating unit |
| 122: classification unit | 130: output unit |

DETAILED DESCRIPTION

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The detailed description to be disclosed hereinafter with the accompanying drawings is intended to describe illustrative embodiments of the present disclosure and is not intended to represent the only embodiments in which the present disclosure may be practiced.

In the following description, 'belief tracking' and 'dialogue state tracking' may be used interchangeably.

In a dialogue system, a dialogue is composed of a series of dialogue turns. Each turn of dialogue includes a plurality of utterances exchanged between the system and its user. In the following description, utterances mean system utterances or user utterances. Additionally, utterances are used in a comprehensive sense to mean all utterances constituting the entire dialogue system or some utterances thereof.

The utterances exchanged in the dialogue system includes a given domain, slot type (slot-type), and predetermined slot values (slot-value) in a domain ontology. Since domains and slot types often have many-to-many correlations with each other, domains and slot types defining a specific slot value are expressed in pairs. As an example of a paired expression, the expression of domain-slot type is used in the following description.

The dialogue state tracker according to at least one embodiment of the present disclosure tracks the dialogue state by predicting, from pre-selected candidate slot values, a probability distribution of a slot value corresponding to the utterance. Additionally, the dialogue state tracker utilizes the dialogue state tracking result as a basis for deriving a matching slot value that finally meets the user's intention.

Figure 1:
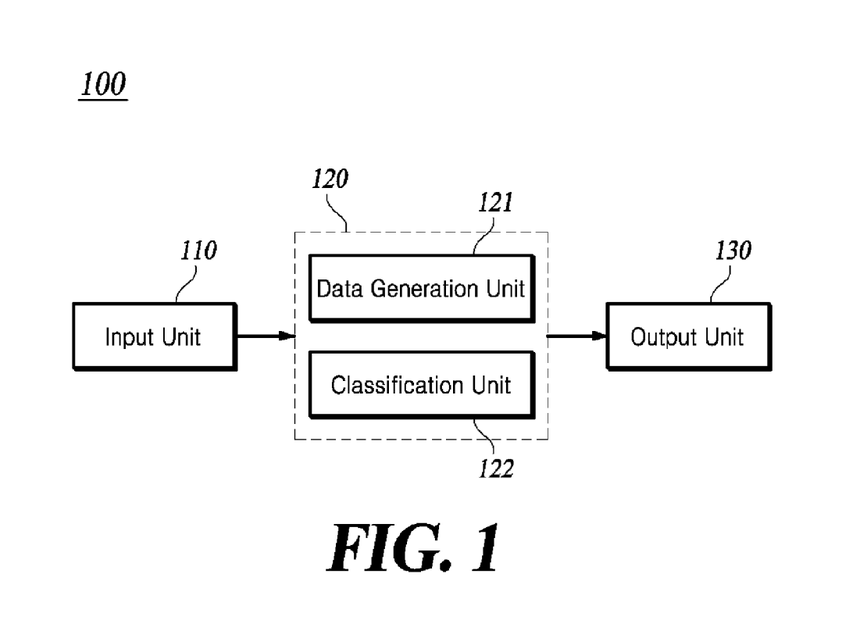
FIG. 1 is a schematic block diagram of a dialogue state tracker in accordance with at least one embodiment of the present disclosure.

FIG. 1 is a schematic block diagram of a dialogue state tracker according to at least one embodiment of the present disclosure.

The dialogue state tracker 100 illustrated in FIG. 1 includes an input unit 110, a learning unit 120, and an output unit 130. In this case, the components included in the dialogue state tracker according to at least one embodiment are not necessarily limited to these specifics. For example, the dialogue state tracker may be further provided with a training unit for training the learning model, or it may be implemented to interwork with an external training unit. The dialogue state tracker 100 may be a component of a dialogue system.

The input unit 110 obtains necessary information in the process of performing the dialogue state tracking.

The input unit 110 according to at least one embodiment receives utterances between the dialogue system and the user and receives input data relevant to their internal target of tracking the dialogue state. The relevant input data may be domain-slot type and candidate slot values or other values including the domain-slot type and candidate slot values.

The learning unit 120 performs a classification process based on the utterances between the user and the dialogue system and the input data provided from the input unit 110 and performs a dialogue state tracking function according to the classification result. Then, based on the dialogue state tracking result, the learning unit 120 performs a function of deriving a matching slot value having a relationship with the user's utterance.

The learning unit 120 according to at least one embodiment has a neural network-based learning model and performs a training process for utterances and input data by using the provided learning model. Such a learning model may be a pre-trained model that is trained in advance to operate based on the utterances and input data to make an inference of a relationship between them and thereby perform the tracking of a dialogue state and derivation of a matching slot value having a relationship with a user's utterance.

Figure 2:
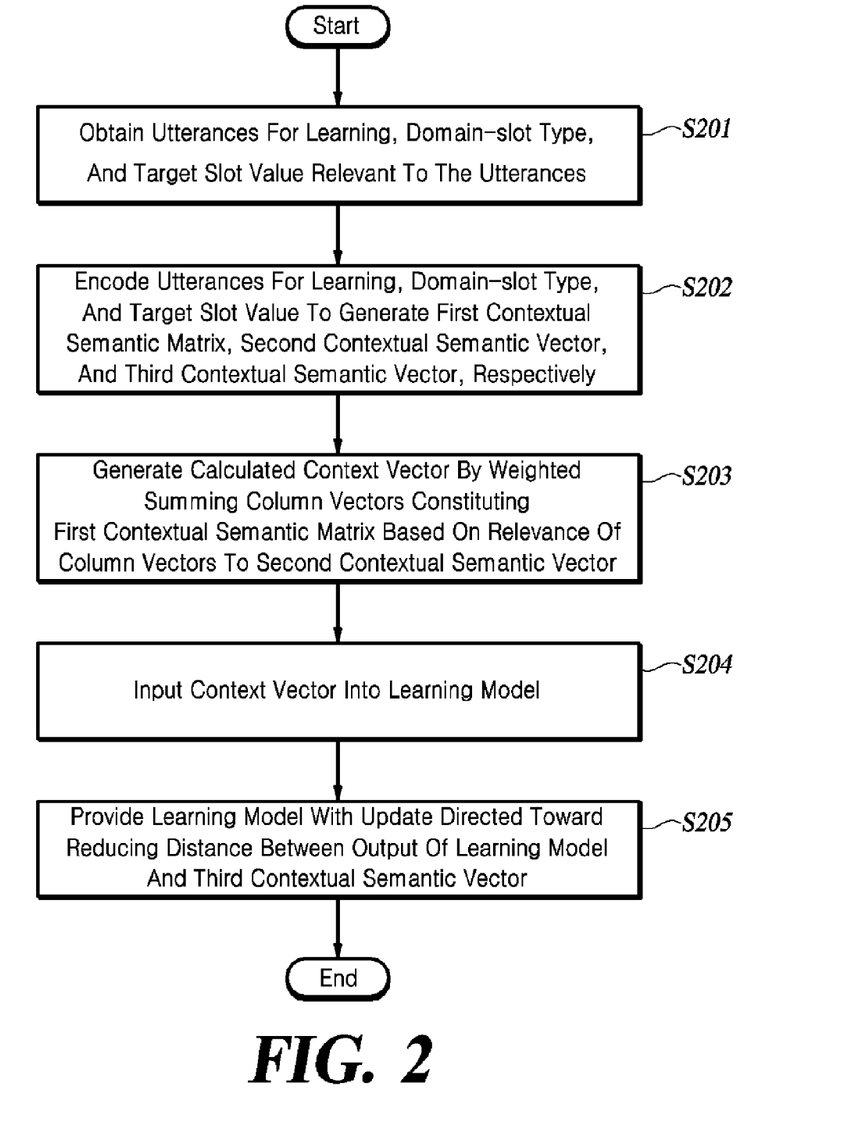
FIG. 2 is a flowchart of a method of tracking a dialogue state and training a learning model according to at least one embodiment of the present disclosure.
Figure 4:
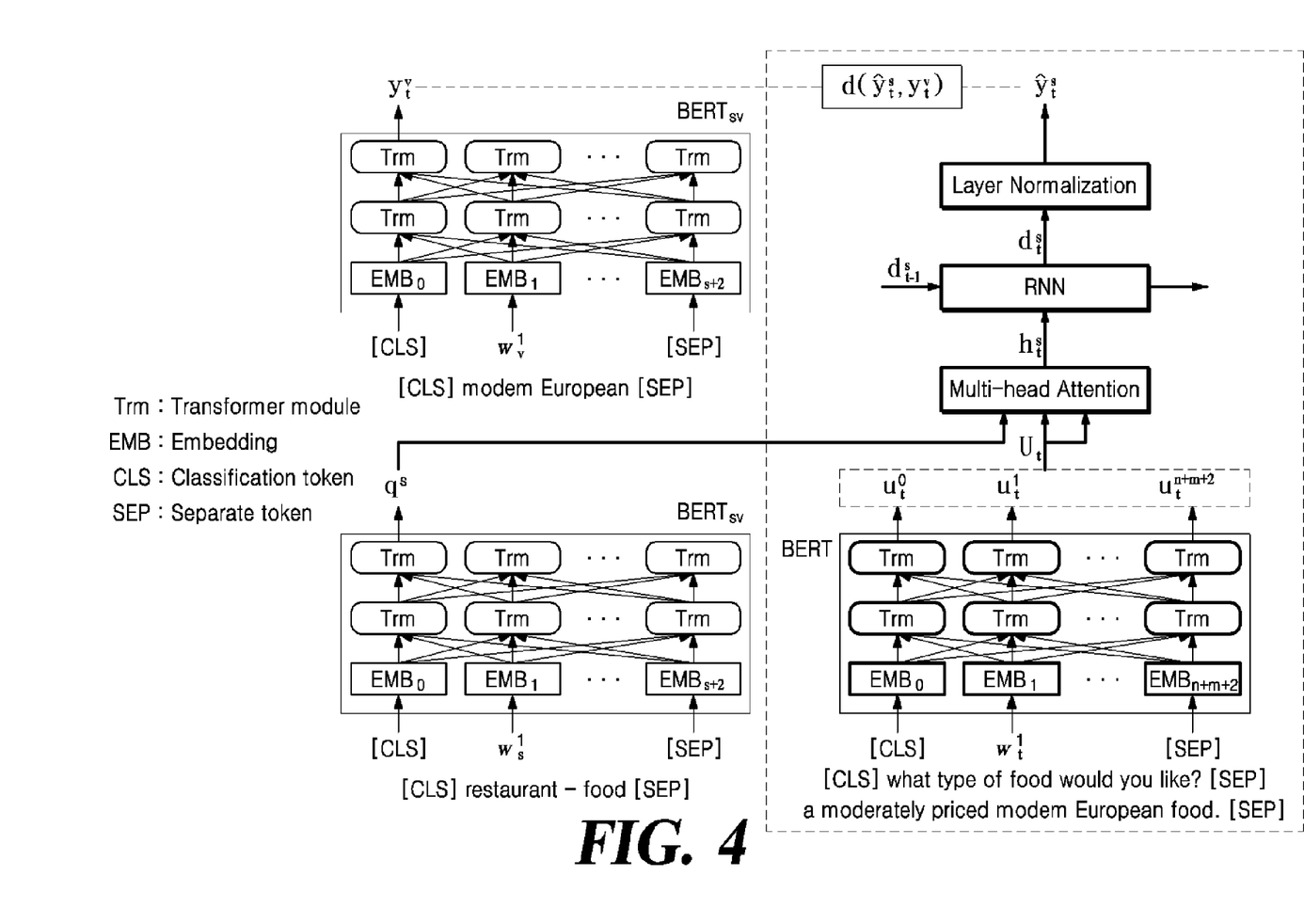
FIG. 4 is a structural diagram of a dialogue state tracker according to at least one embodiment of the present disclosure.

The following describes a training process of the learning model by referring to FIGS. 2 and 4 together.

FIG. 2 is a flowchart of a method of tracking a dialogue state and training a learning model according to at least one embodiment of the present disclosure. FIG. 4 is a structural diagram of a dialogue state tracker according to at least one embodiment of the present disclosure.

A training unit (not shown) obtains utterances for learning, a domain-slot type, and a target slot value as input data (S201).

The input data is a vector expression in the form of a sentence from a combination of word embeddings corresponding respectively to the words constituting the data. System utterances for learning are denoted by $X_t^{sys}$, user utterances for learning by $X_t^{usr}$, a domain-slot type by $X^s$, and a target slot value $X_t^v$. Here, the superscripts 's' and 'v' denote domain-slot types and slot values, respectively, the subscript 't' denotes a dialogue turn, and 'sys' and 'usr' denote a dialogue system and a user, respectively. In the following description, the utterances for learning is a combination of the system utterances for learning and the user utterances for learning.

In at least one embodiment, the training unit encodes the utterances for learning to generate a first contextual semantic matrix, encodes the domain-slot type to generate a second contextual semantic vector, and encodes the target slot value to generate a third contextual semantic vector (S202).

When encoding, the training unit utilizes a pre-trained sentence encoder model. As the sentence encoder model, a Bi-directional Encoder Representations from Transformers (BERT) encoder is used. For specific details regarding BERT, Non-Patent Document 6 can be referenced. The BERT encoder is pre-trained by applying unsupervised learning to a large dialogue corpus that has no correct answer label or that is unlabeled.

The training unit utilizes pre-trained BERT encoders to derive contextual semantic vectors indicating embeddings corresponding respectively to the input data items in the form of sentences.

The BERT encodes the word embeddings constituting the learning utterances one by one to calculate the corresponding contextual semantic vectors, and then combines the calculated contextual semantic vectors into a column vector to derive the first contextual semantic matrix. The first contextual semantic matrix is denoted by $U_t$, and the i-th column vector $u_t^i$ of $U_t$ is the output of the BERT corresponding to the i-th word of the learning utterances. The second contextual semantic vector is denoted by $q^s$, and the third contextual semantic vector is $y_t^v$.

Additionally, in at least one embodiment, the training unit performs a fine-tuned training on the BERT encoder based on a loss function shown in Equation 3 to be introduced below.

In this embodiment, the training unit generates a calculated context vector by weighted summing the column vectors constituting the first contextual semantic matrix based on the relevance of the column vectors to the second contextual semantic vector (S203).

An attention mechanism is utilized to obtain information related to a domain-slot type from utterances between the dialogue system and the user. As the attention mechanism, a multi-head attention method may be used. The multi-head attention calculates the correlations or relevances between the second contextual semantic vector and column vectors constituting the first contextual semantic matrix by obtaining and utilizing a scaled dot-product between the second contextual semantic vector and the column vectors. Then, the multi-head attention utilizes the calculated relevances as weights for application to the column vectors constituting the first contextual semantic matrix to calculate a weighted sum of the column vectors and thereby calculate and generate a context vector $h_t^s$.

Context vector $h_t^s$ is expressed by Equation 1, where Q denotes a query matrix, K is a key matrix, and V is a value matrix. In at least one embodiment, Q is a matrix in which each column is repeatedly filled with a second contextual semantic vector $q^s$, and K and V are set to first contextual semantic matrix $U_t$.

$$h_t^s = \text{MultiHead}(Q,K,V) \qquad \text{Equation 1}$$

In multi-head attention, multiple heads are used to perform parallel processing. To this end, after the linear projection of the matrices Q, K, and V respectively into multiple submatrices corresponding to the multiple heads, the attention mechanism is applied to the projected submatrix for each head to obtain multiple head outputs. Finally, by further concatenating the multiple head outputs, context vector $h_t^s$ is calculated. Further, in at least one embodiment, the training unit updates the parameters that are used for the multi-head attention based on a loss function expressed in Equation 3 to be introduced below.

In the present embodiment, the training unit inputs the context vector into the learning model (S204) to obtain an output and then updates the learning model by providing parameters of the learning model with an update directed toward reducing a distance between the output of the learning model and the third contextual semantic vector (S205).

In the learning process, the dialogue state in the current turn is determined by the history of previous dialogues and the dialogue in the current turn. This dialogue flow can be learned by the Recurrent Neural Network (RNN) model of neural network. RNN-based neural networks include a Long Short-Term Memory (LSTM) model, a Gated Recurrent Unit (GRU), a Transformer Decoder, and the like. The following description assumes that one of the preceding example learning models is used with the notation of RNN.

In at least one embodiment, the training unit normalizes the output value generated by the RNN by applying layer normalization to the output value. Through normalization, the output range of the RNN is matched with the output range that is from the target slot value-generating BERT encoder and after the layer normalization. The normalized output value is the final output value of the learning model and is denoted by $\hat{y}_t^s$.

The dialogue state tracking is a process of inferring a probability distribution for a corresponding slot value by conducting training so that the output value of the RNN approaches the target slot value.

In at least one embodiment, the probability distribution of the slot value is expressed in a non-parametric method based on a distance metric, wherein the distance metric is applied between the output value of the RNN and the target slot value. As the distance metric, Euclidean distance or negative cosine distance may be used, but the present disclosure is not so limited.

The probability distribution of a slot value $v_t$ in a dialogue turn t is expressed by Equation 2.

Here, d is a distance metric, and $C_s$ is a set of candidate slot values corresponding to a domain-slot type s, which are pre-selected in the domain ontology.

$$p(u_t \mid x_{\leq t}^{sys}, x_{\leq t}^{usr}, s) = \frac{\exp(-d(\hat{y}_t^s, y_t^u))}{\sum_{u' \in C_s} \exp(-d(\hat{y}_t^s, y_t^{u'}))} \quad \text{Equation 2}$$

In at least one embodiment, for the training of the RNN, the training unit uses a loss function obtained by combining probability distributions for all domain-slot types and dialogue turns. The loss function covering all the dialogue turns t and the domain-slot types $s \in D$ is expressed by Equation 3.

$$L(\theta) = -\sum_{s \in D} \sum_{t=1}^{T} \log p(u_t \mid x_{\leq t}^{sys}, x_{\leq t}^{usr}, s) \quad \text{Equation 3}$$

The training unit trains the learning model by using the loss function expressed in Equation 3 through the process of adjusting the parameters of the RNN.

As described above, when obtaining the context vector, no particular restriction is applied to the number of second contextual semantic vectors representing the domain-slot type. Therefore, the dialogue state tracker 100 according to at least one embodiment can process multi-domain. Additionally, the dialogue state tracker is allowed to operate independently of the domain-slot type with the loss function expressed in Equation 3 used for adjusting all the parameters of the dialogue state tracker including the parameters of the BERT, multi-head attention, and RNN. Therefore, based on the single model according to at least one embodiment, the present disclosure facilitates the service scenario expansion inclusive of a multi-domain in the dialogue system in concert with domain-slot type additions.

The learning unit 120 utilizes the learned dialogue state tracker as described above for receiving target utterances between the dialogue system and the user, second contextual semantic vectors corresponding respectively to domain-slot types, and third contextual semantic vectors corresponding respectively to candidate slot values and thereby tracks the dialogue state and derives a matching candidate slot value having relevance to the user's utterance.

In at least one embodiment, the learning unit 120 may be implemented to include a data generating unit 121 and a classifying unit 122. These components included in the learning unit 120 are activated by the dialogue state tracker including the BERT, multi-head attention, learning model, and the like thereof, and allow preset procedures to be automatically executed when activated.

The following refers to a portion indicated by a dotted lined box in FIG. 4 for describing the operation of the respective components of the learning unit 120 according to at least one embodiment.

The target utterances are expressed as a vector in the form of a sentence by combining word embeddings corresponding respectively to the words constituting the utterances.

The data generating unit 121 encodes the respective words included in the target utterances to generate the first contextual semantic matrix. The plurality of second and third contextual semantic vectors are those stored in the learning process. Next, the data generating unit 121 calculates the context vector for each second contextual semantic vector by applying the first contextual semantic matrix and the plurality of second contextual semantic vectors to the attention mechanism. Since the encoding process and the process of applying the contextual semantic vector to the attention mechanism were discussed when describing the training unit, further detailed descriptions are omitted.

The classification unit 122 applies each context vector to the learning model to extract an output of the learning model for each second contextual semantic vector. In at least one embodiment, an RNN is used as the learning model. The learning model is provided with parameters trained in advance to derive, based on the output of the RNN and from among candidate slot values, the candidate slot value relevant to utterances between the dialogue system and the user.

The classification unit 122 tracks the dialogue state based on the output of the RNN and derives, from among the candidate slot values, a matching slot value having relevance to the utterance between the dialogue system and the user.

In at least one embodiment, the classification unit 122 selects, from among a plurality of third contextual semantic vectors, a slot value corresponding to a single third contextual semantic vector having a minimum distance from the RNN output for each context vector, thereby deriving a matching slot value that meets the user's intention.

Dialogue state tracking is to infer a probability distribution of a slot value derived as a matching slot value among candidate slot values. As described above about the training unit, the probability distribution of the slot value is expressed by Equation 1.

Before deriving the matching slot value, the classification unit 122 compares with a preset threshold the minimum distance calculated to derive the matching slot value. When the minimum distance is less than or equal to the preset threshold, the classification unit 122 derives the candidate slot value at that time as a matching slot value. Conversely, when the minimum distance is greater than the preset threshold, the classification unit 122 regards the output of the RNN as a new slot value and adds the output to the list of candidate slot values.

The output unit 130 provides the user with auralization or visualization of the correspondence processing by the dialogue system based on the derived matching slot value.

Figure 3:
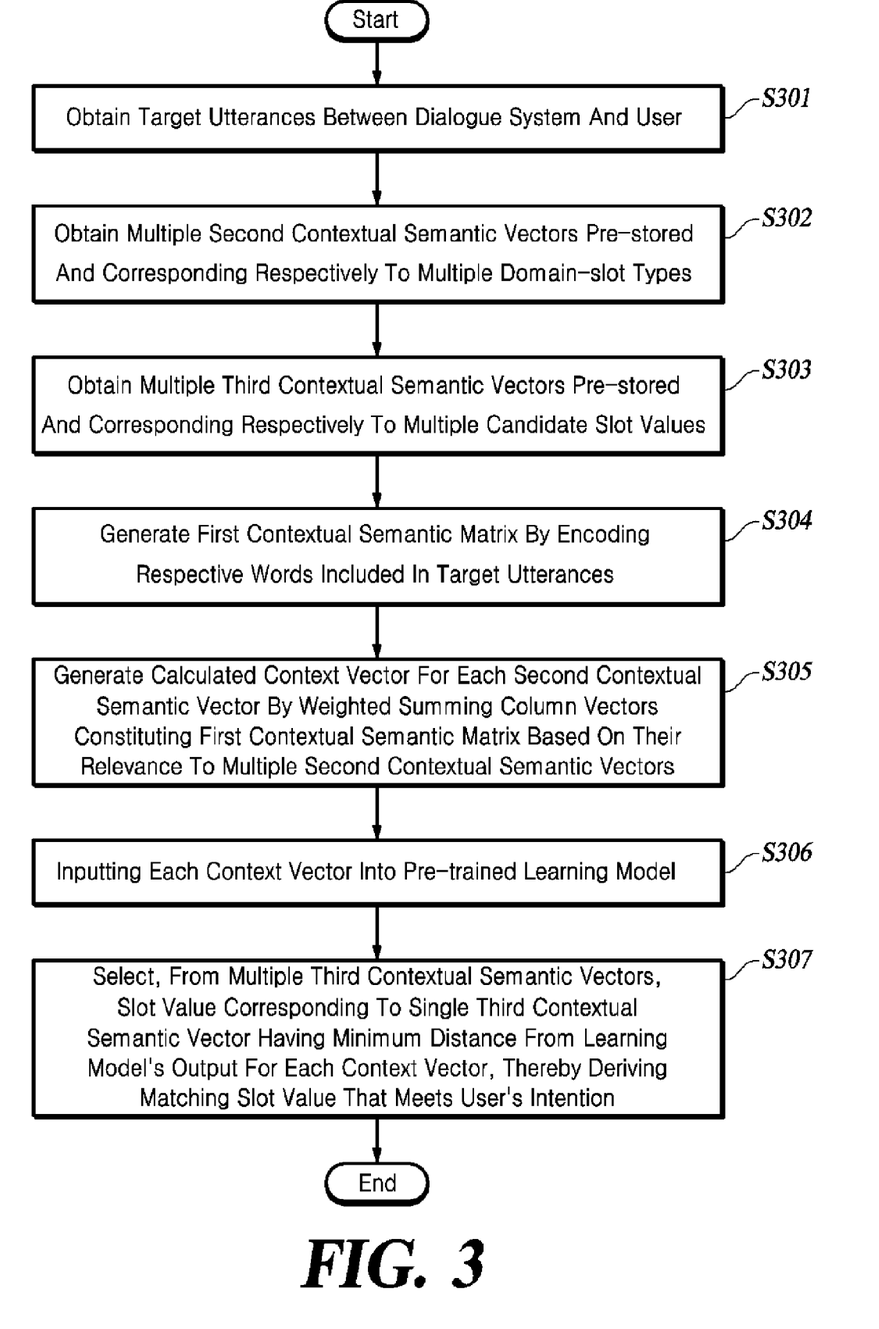
FIG. 3 is a flowchart of a method of tracking a dialogue state and deriving a matching slot value according to at least one embodiment of the present disclosure.

FIG. 3 is a flowchart of a method of tracking a dialogue state and deriving a matching slot value according to at least one embodiment of the present disclosure.

The following describes a method of tracking a dialogue state and deriving a matching candidate slot value by referring to the dotted lined box in FIG. 4 together with FIG. 3.

The dialogue state tracker 100 obtains target utterances between the dialogue system and the user (S301) and obtains multiple second contextual semantic vectors corresponding respectively to multiple domain-slot types (S302). Further, the dialogue state tracker 100 obtains multiple third contextual semantic vectors corresponding respectively to multiple candidate slot values (S303). The multiple second contextual semantic vectors and third contextual semantic vectors are those generated in the training process and stored in advance.

The dialogue state tracker 100 generates a first contextual semantic matrix by encoding the respective words included in the target utterances (S304).

Thereafter, the dialogue state tracker 100 generates a calculated context vector for each second contextual semantic vector by weighted summing column vectors constituting the first contextual semantic matrix based on their relevance to the multiple second contextual semantic vectors (S305). Then, each context vector is inputted to the pre-trained learning model (S306) and the output is extracted for each context vector.

Since the process of encoding and calculating the context vector has already been mentioned when describing the training unit, further detailed description thereof will be omitted.

The dialogue state tracker 100 selects, from among the multiple third contextual semantic vectors, a slot value corresponding to a single third contextual semantic vector having a minimum distance from the learning model's output for each context vector, thereby deriving a matching slot value that meets the user's intention (S307).

Since the process of deriving the matching slot value has already been mentioned when describing the learning unit, further detailed description thereof will be omitted.

The following describes a result of evaluating the performance of the dialogue state tracker 100 according to at least one embodiment of the present disclosure. The target DataBase (DB) used for performance evaluation is WOZ2.0. WOZ2.0 DB is a DB including one domain for handling restaurant reservations, and the dialogue state tracker estimates three slots (area, food, and price). Additionally, since the present disclosure introduces its capacity of multi-domain processing in at least one embodiment, the performance is evaluated by using MultiWOZ. MultiWOZ DB is a dialogue corpus including multiple domains, including 7 domains and 35 slots.

The evaluation environment is as follows, wherein the pre-trained BERT encoder is first composed of 12 layers. For multi-head attention, the evaluation uses 4 or 8 heads. Next, an LSTM or GRU having one layer is used for the RNN. Both Euclidean distance or negative cosine similarity are used for the distance metric. Finally, Adam Optimizer is used to train the learning model.

Joint goal accuracy is used for performance evaluation, which is a value calculated when the evaluation model correctly selects all of the domains, slot types, and slot values included in the target utterance. After obtaining joint goal accuracy for respective simulations by using 20 different random seeds, their mean and standard deviation were calculated.

The evaluation results from using WOZ2.0, according to at least one embodiment are shown in Table 1. Comparison targets include, in addition to the five methods in the prior art literature, a slot-dependent model obtained by so modifying the method according to at least one embodiment. The slot-independent model according to at least one embodiment of the present disclosure shows the best performance.

TABLE 1

| Model | Joint Accuracy |
| --- | --- |
| NBT-DNN (Non-patent document 1 cited) | 0.844 |
| BT-CNN (Non-patent document 2 cited) | 0.855 |
| GLAD (Non-patent document 3 cited) | 0.881 |
| GCE (Non-patent document 4 cited) | 0.885 |
| StateNetPSI (Non-patent document 5 cited) | 0.889 |
| Slot-dependent model | 0.891 (0.010) |
| Slot-independent model (inventive) | 0.910 (±0.010) |

Meanwhile, the evaluation results from using MultiWOZ, according to at least one embodiment are shown in Table 2. For comparison, three methods in the prior art literature were employed. Similarly, the slot-independent model according to at least one embodiment of the present disclosure shows the best performance.

TABLE 2

| Model | Joint Accuracy |
| --- | --- |
| Benchmark baseline (see Note below) | 0.2583 |
| GLAD (Non-patent document 3 cited) | 0.3557 |
| GCE (Non-patent document 4 cited) | 0.3558 |
| Slot-independent model (inventive) | 0.4240 (±0.0187) |

Note:
dependent on the illustrative method of Non-patent document 2, the results being presented in http://dialogue.mi.eng.cam.ac.uk/index.php/corpus/

Figure 5A:
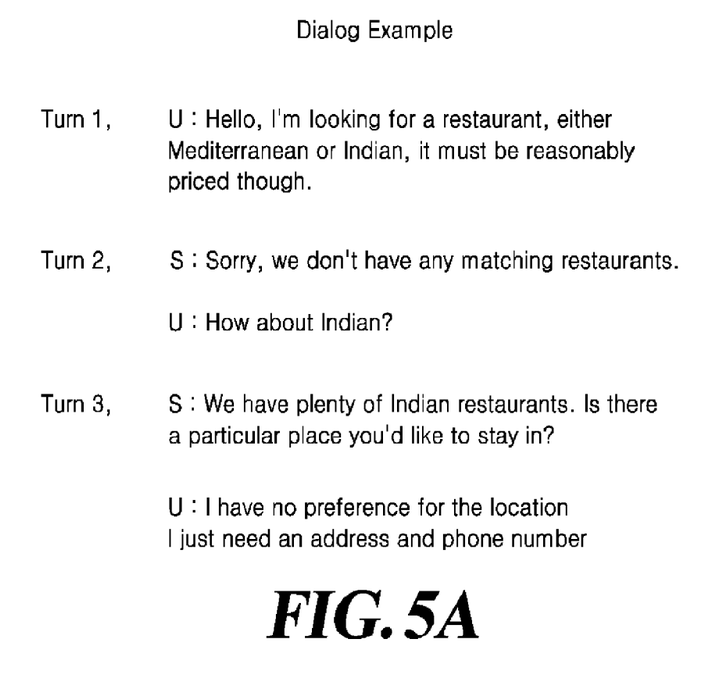
FIGS. 5A and 5B are example weights calculated with a multi-head attention according to at least one embodiment of the present disclosure
Figure 5B:
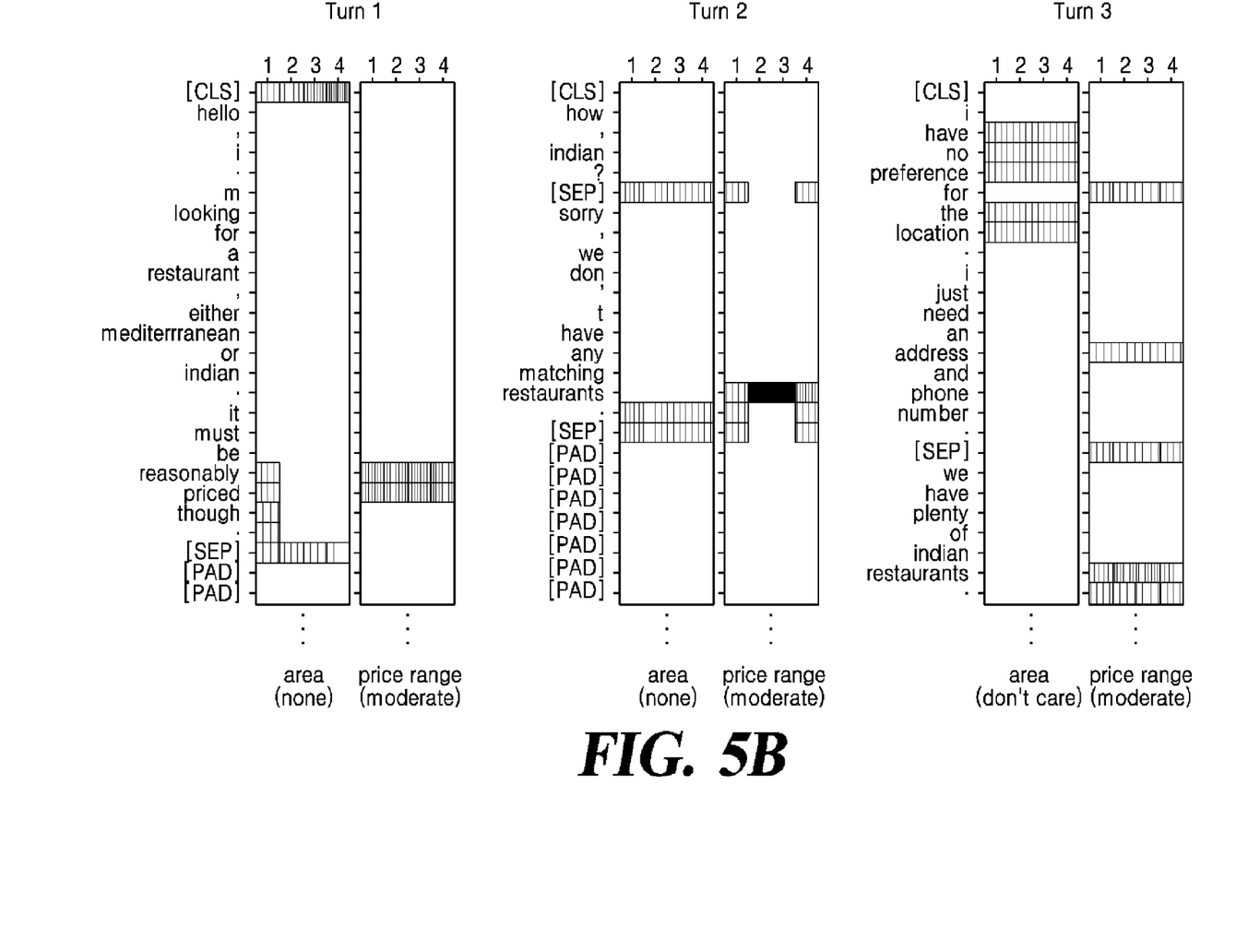

The following presents example weights calculated by a multi-head attention according to at least one embodiment of the present disclosure referring to FIGS. 5A and 5B. FIG. 5A is example turns of a target dialogue illustrating a total of three turns. The target dialogue is included in WOZ2.0, and the domain-slot types suggested for the attention are 'area' and 'price range'. The result of the attention is illustrated in FIG. 5B. In FIG. 5B, four heads are used for attention, and the words presented in parentheses are slot values.

In the first dialogue turn, the attention weight is high for a reasonably priced, for which the corresponding slot value of the price range is 'moderate'. In the third dialogue turn, the attention weight for having no preference predicts the slot value 'don't care' for the area. When there is no appropriate slot value corresponding to the presented domain-slot type (when the slot value is 'none'), Classification embedding (CLS) and SEParate (SEP) tokens are being attended. Here, the CLS token is attached to the front of dialogue and used for classification, and the SEP token expresses the division of utterances and the end of the dialogue.

The dialogue state tracker 100 according to some embodiments of the present disclosure is effective to provide a dialogue state tracking method for tracking a dialogue state between a user and the system in a goal-oriented dialogue system through training based on an attention mechanism between utterances and contextual semantic vectors corresponding respectively to domain-slot types and based on a non-parametric method using a distance metric. Accordingly, the embodiments can facilitate service extension to a multi-domain scenario in the dialogue system.

Although some embodiments of the present disclosure present flowcharts with the steps thereof illustrated as being sequentially performed, they merely instantiate the technical idea of some embodiments of the present disclosure. Therefore, a person having ordinary skill in the pertinent art could incorporate various modifications, additions, and substitutions in practicing the present disclosure by changing the sequence of steps described by the respective flowcharts or by performing one or more of the steps in the flowcharts in parallel, and hence the steps in the respective flowcharts are not limited to the illustrated chronological sequences.

Some or all of the technical processes of the embodiments described above can be implemented as a computer program and can be stored in a computer-software-readable and non-volatile or non-transitory recording medium (CD-ROM, ROM, memory card, hard disk, optical/magnetic disk, storage devices, and the like).

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

CROSS-REFERENCE TO RELATED APPLICATION

This application claims priority from Korean Patent Application No. 10-2019-0086380 filed on Jul. 17, 2019, the disclosure of which is incorporated by reference herein in its entirety.

The invention claimed is:

1. A method of tracking a dialogue state in a dialogue system, the method comprising:
    obtaining target utterances between the dialogue system and a user;
    generating a first contextual semantic matrix by encoding respective words included in the target utterances;
    calculating, by processing vectors constituting the first contextual semantic matrix based on a relevance of the vectors to a plurality of second contextual semantic vectors pre-stored and corresponding respectively to a plurality of domain-slot types, a context vector for each second contextual semantic vector;
    inputting each context vector into a learning model that is pre-trained; and
    deriving, from a plurality of third contextual semantic vectors pre-stored and corresponding respectively to a plurality of candidate slot values, a slot value corresponding to a third contextual semantic vector alone having a minimum distance from an output of the learning model for each context vector,
    wherein the calculating of the context vector comprises calculating weights with a multi-head attention having parameters that are trained and by obtaining and using a scaled dot-product between each second contextual semantic vector and column vectors constituting the first contextual semantic matrix, and applying the weights to the column vectors constituting the first contextual semantic matrix to calculate a weighted sum of the column vectors.

2. The method of claim 1, wherein the generating of the first contextual semantic matrix comprises:
    utilizing a sentence encoder having parameters that have undergone fine-tuned training to generate the first contextual semantic matrix.

3. The method of claim 2, wherein the generating of the first contextual semantic matrix comprises:
    encoding word embeddings constituting the target utterances one by one by utilizing the sentence encoder to calculate vectors corresponding respectively to the word embeddings, and then combining calculated vectors in a form of a column vector to derive the first context semantic matrix.

4. The method of claim 1, wherein the deriving of the slot value comprises tracking a probability distribution of the slot value derived from the plurality of candidate slot values.

5. The method of claim 1, wherein the deriving of the slot value comprises regarding the output of the learning model as a new slot value to add to a list of the candidate slot values for the case that the minimum distance calculated for deriving the slot value based on the plurality of third contextual semantic vectors and the output of the learning model is greater than a preset threshold.

6. An apparatus for tracking a dialogue state, comprising:
    a processor; and memory storing instructions thereon, the instructions when executed by the processor cause the processor to:
    obtain target utterances between a dialogue system and a user;
    generate a first contextual semantic matrix by encoding respective words included in the target utterances and to calculate, by processing vectors constituting the first contextual semantic matrix based on a relevance of the vectors to a plurality of second contextual semantic vectors pre-stored and corresponding respectively to a plurality of domain-slot types, a context vector for each second contextual semantic vector; and
    input each context vector into a learning model that is pre-trained and to derive, from a plurality of third contextual semantic vectors pre-stored and corresponding respectively to a plurality of candidate slot values, a slot value corresponding to a third contextual semantic vector alone having a minimum distance from an output of the learning model for each context vector,
    wherein the context vector is calculated by calculating weights with a multi-head attention having parameters that are trained and by obtaining and using a scaled dot-product between each second contextual semantic vector and column vectors constituting the first contextual semantic matrix, and applying the weights to the column vectors constituting the first contextual semantic matrix to calculate a weighted sum of the column vectors.

7. The apparatus of claim 6, wherein the memory further stores instructions causing the processor to encode word embeddings constituting the target utterances one by one by utilizing a sentence encoder having parameters that have undergone a fine-tuned training to calculate vectors corresponding respectively to the word embeddings, and then combining calculated vectors in a form of a column vector to derive the first context semantic matrix.

8. The apparatus of claim 6, wherein the memory further stores instructions causing the processor to calculate weights with a multi-head attention having parameters that are trained and by obtaining and using a scaled dot-product between the second contextual semantic vectors and column vectors constituting the first contextual semantic matrix, and to apply the weights to the column vectors constituting the first contextual semantic matrix to calculate a weighted sum of the column vectors.

9. The apparatus of claim 6, wherein the memory further stores instructions causing the processor to track a probability distribution of the slot value derived from the plurality of candidate slot values.

10. The apparatus of claim 6, wherein the memory further stores instructions causing the processor to regard the output of the learning model as a new slot value to add to a list of the candidate slot values for the case that the minimum distance calculated for deriving the slot value based on the plurality of third contextual semantic vectors and the output of the learning model is greater than a preset threshold.

11. A non-transitory computer-readable medium storing computer-executable instructions for causing, when executed by the computer, the computer to perform a method comprising:
  obtaining target utterances between a dialogue system and a user;
  generating a first contextual semantic matrix by encoding respective words included in the target utterances;
  calculating, by processing vectors constituting the first contextual semantic matrix based on a relevance of the vectors to a plurality of second contextual semantic vectors pre-stored and corresponding respectively to a plurality of domain-slot types, a context vector for each second contextual semantic vector;
  inputting each context vector into a learning model that is pre-trained; and
  deriving, from a plurality of third contextual semantic vectors pre-stored and corresponding respectively to a plurality of candidate slot values, a slot value corresponding to a third contextual semantic vector alone having a minimum distance from an output of the learning model for each context vector,
  wherein the calculating of the context vector comprises calculating weights with a multi-head attention having parameters that are trained and by obtaining and using a scaled dot-product between each second contextual semantic vector and column vectors constituting the first contextual semantic matrix, and applying the weights to the column vectors constituting the first contextual semantic matrix to calculate a weighted sum of the column vectors.

\* \* \* \* \*